UNITED STATES PATENT OFFICE.

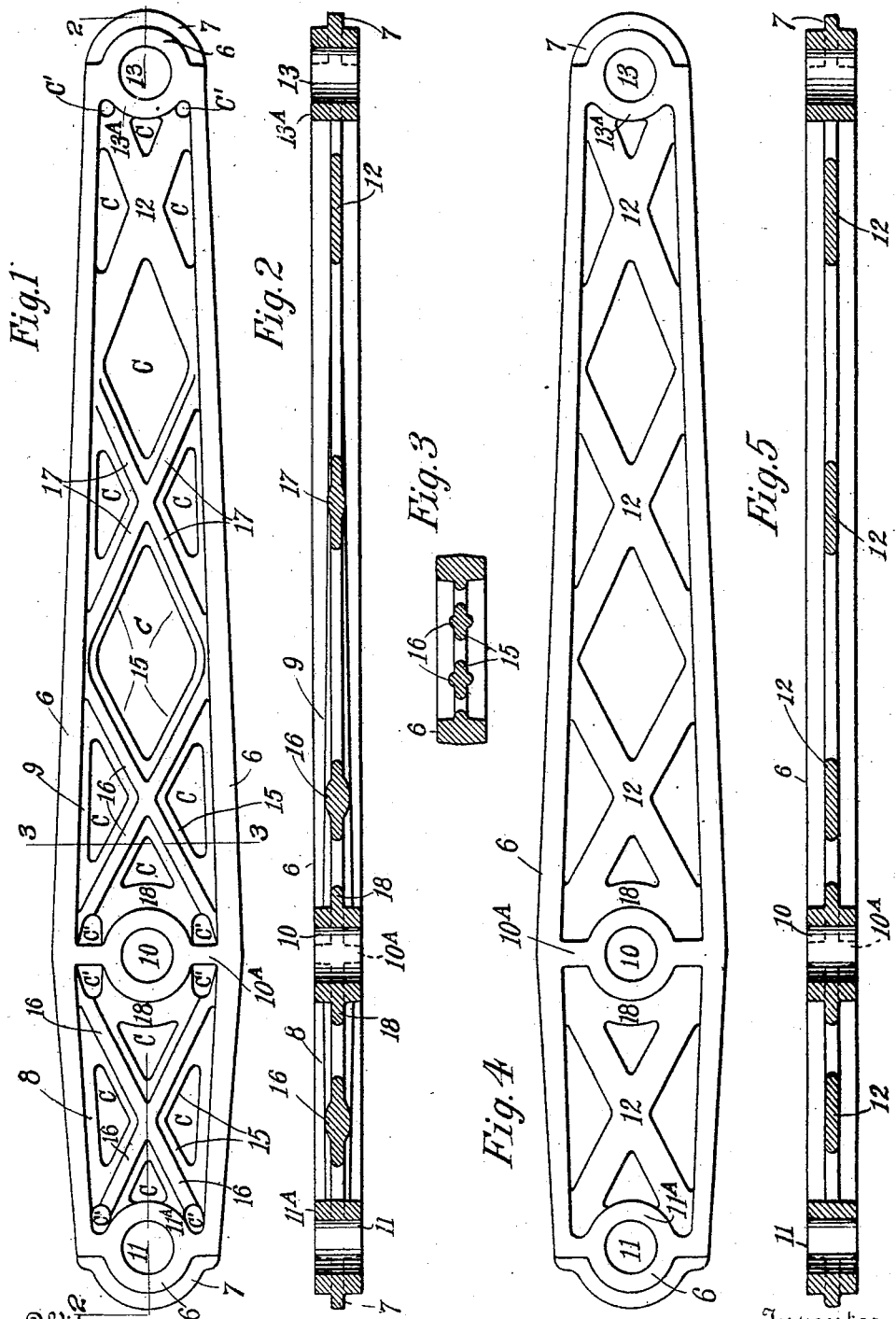

ROBERT E. FRAME, OF ST. LOUIS, MISSOURI, ASSIGNOR OF ONE-HALF TO HERBERT W. WOLFF, OF ST. LOUIS, MISSOURI.

BRAKE-LEVER.

No. 907,767.      Specification of Letters Patent.      Patented Dec. 29, 1908.

Application filed May 22, 1908. Serial No. 434,353.

*To all whom it may concern:*

Be it known that I, ROBERT E. FRAME, residing at St. Louis, Missouri, and being a citizen of the United States, have invented certain new and useful Improvements in Brake-Levers, of which the following is a full, clear, and exact description, such as will enable others skilled in the art to which it appertains to make and to use the same, reference being had to the accompanying drawings, which illustrate the preferred form of the invention, though it is to be understood that the invention is not limited to the exact details of construction shown and described, as it is obvious that various modifications thereof will occur to persons skilled in the art.

In said drawings: Figure 1 is a plan view of my improved brake lever; Fig. 2 is a central longitudinal section thereof on the line 2—2 of Fig. 1; Fig. 3 is a transverse sectional view taken on the line 3—3 of Fig. 1; Fig. 4 is a plan view of a modified construction of brake lever; and Fig. 5 is a central longitudinal sectional view of the modification shown in Fig. 4.

The object of the invention is to produce a brake lever of malleable iron comprising a perimetrical portion or frame carrying a center pin bearing and end bearings and reinforced by crossed connecting ribs of such form and thickness as to provide a brake lever of sufficient strength to meet the standard requirements of railway service, the parts being so proportioned and arranged as to provide the necessary strength to resist service stresses with a minimum quantity of metal whereby a light, strong and durable brake lever is produced.

In the brake lever illustrated in Figs. 1, 2 and 3, 6 indicates the perimetrical flange portion which entirely surrounds the bearings and is provided with an end flange 7 extending therebeyond at each end. Next within the flange 6 in the modification shown in Fig. 1 are longitudinally extending and inwardly projecting flanges 8 and 9, the flange 8 extending from the center bearing 10 to the end bearing 11 of uniform thickness from the bearing 11 to said bearing 10. The flange 9 extends from the bearing 10 in the opposite direction and is of uniform thickness with the crossed ribs 12 with which said inwardly extending flanges merge as best shown in Figs. 1 and 5. At the free end of the lever opposite the bearing 11 is another bearing 13, all of the bearings 10, 11 and 13, being located within the perimetrical flange 6 as shown. Extending transversely of the lever and forming parts of the bearings 11 and 13 are thickened portions 11$^A$ and 13$^A$. Intermediate the bearings 11 and 13 and at the widest part of the lever are transversely extending ribs 10$^A$ which connect the center pin bearing 10 with the perimetrical flange 6. In both modifications there are provided crossed connecting ribs 12 which in Figs. 4 and 5 extend to the flange 6 throughout the length of the lever and in the modification of Fig. 1 extend to said flange 6 near the smaller end of the lever. The remaining portion of the lever of Fig. 1 comprises ribbed flanges 15 which merge with the longitudinal flanges 8 and 9 and are provided with obliquely disposed intersecting ribs 16 adapted to reinforce said ribs 15. Between the ribs 16 and the ribs 12 are other crossed ribbed connecting members 17 which are of less thickness than the ribbed portions 16 before referred to.

It will be observed that there is no web portion between the flanges 6, the sole connection being the ribs referred to which are so proportioned that the greater thickness of metal is distributed in the near vicinity of the center bearing 10 at which the pressure in service varies from approximately 6000 lbs. to 9000 lbs., and to reinforce the lever in the vicinity of said center bearing, fillets 18 are provided which connect the rib members 16 and said center bearing 10.

To lighten the lever as much as possible, openings C are provided in the casting while other openings C' are provided to prevent shrinkage cracks in said casting, and the parts are so arranged and proportioned that the lever may be cast in green sand without cores except at the bearings 10, 11 and 13.

It is to be observed that the flange 6 is thickest on the line extending transversely through the center bearing 10 and longitudinally of the ribs 10$^a$, the thickness of said flange decreasing somewhat toward the bearing 11 and being considerably thinner in the vicinity of the bearing 13, although it is to be observed that the width of said bearing— that is from top to bottom of Fig. 2—is the same from end to end of the lever shown in both modifications.

It is to be understood that my lever is formed without a thin central web and that the ribs projecting toward opposite sides extend in the same directions intersecting as shown in Figs. 1 and 3. Thus, I am able to produce a brake lever constructed of malleable iron or suitable metal with greatly reinforced central rib portion with thickened perforated end and intermediate portions to form pivot bearings and with peripheral flanges on both sides at the ends of said ribbed portions, the parts being thickest in the vicinity of the central bearing where the strain is greatest and of gradually reducing section where the strain in service is less than at said central bearing.

What I claim is:—

1. As a new article of manufacture, a cast metal brake lever formed without a central web portion and having thickened perimetric portion and integral cross connecting spaced portions of relatively less thickness than said perimetric portion.

2. As a new article of manufacture, a cast metal brake lever formed without a central web portion and having a marginal flange with pivot bearings relatively within said marginal portion, another pivot bearing away from the central portion of said lever and having intersecting middle portions of less thickness than said marginal flange between said last mentioned pivot bearing and the end of said lever.

3. As a new article of manufacture, a cast metal brake lever formed without a central web portion and of relatively I-shape in transverse section and having relatively thin spaced middle rib portions and thickened pivot sockets, with perimetrical portion of varying thickness from end to end.

4. As a new article of manufacture, a cast metal brake lever formed without a central web portion and having thickened marginal flange which is relatively the same width and of varying thickness from end to end, said lever having intersecting middle rib portions of less thickness than said marginal portion and thickened pivot bearings relatively within said marginal flange.

5. As a new article of manufacture, an integral cast metal brake lever formed without a central web portion and having a marginal portion which is of varying thickness in transverse section, said lever having trussed ribbed middle portions of less thickness than said marginal portion and having thickened pivot bearings within said marginal portion.

6. As a new article of manufacture, a cast metal brake lever having a continuous multiform marginal portion, with thickened pivot socket portions merging therein and having diagonally disposed crossed ribs connecting said marginal portions, said ribs being of various thicknesses.

7. As a new article of manufacture, a truss shaped cast metal brake lever formed without a central web portion and having perimetric portion of varying thickness and integral cross connecting ribs of less thickness than said perimetric portion with spaces between parts of said connecting portions.

8. As a new article of manufacture, a brake lever of cast metal wherein the perimetric portions are relatively the same width from end to end and of varying thickness and the central portion comprises ribs with spaces between parts thereof.

9. As a new article of manufacture, a cast metal brake lever formed without a central web portion and having thickened perimetric portion merging in thickened pivot sockets relatively within said perimetric portion and having a relatively thin middle portion composed entirely of spaced intersecting rib members.

10. As a new article of manufacture, a cast metal brake lever formed without a central web portion and having a marginal flange, said lever having intersecting middle portions of less thickness than said marginal flange, and thickened pivot bearings, within said marginal flange.

11. As a new article of manufacture, a truss shaped integral cast metal brake lever formed without a central web portion and having thickened multiform perimetric portion with pivot bearings therein and obliquely disposed intersecting integral crossed connecting ribs of varying thickness.

12. As a new article of manufacture, a truss shaped integral brake lever of cast metal having multiform perimetric portions and spaced crossed connecting portions of less thickness.

In witness whereof I have hereunto set my hand in the presence of two witnesses.

ROBERT E. FRAME.

Witnesses:
FREDERICK H. GIBBS,
FRANK V. COOPER.